March 29, 1927.
D. J. DOLAN
1,622,575
STEERING WHEEL LOCK MECHANISM
Filed Aug. 23, 1921
2 Sheets-Sheet 1
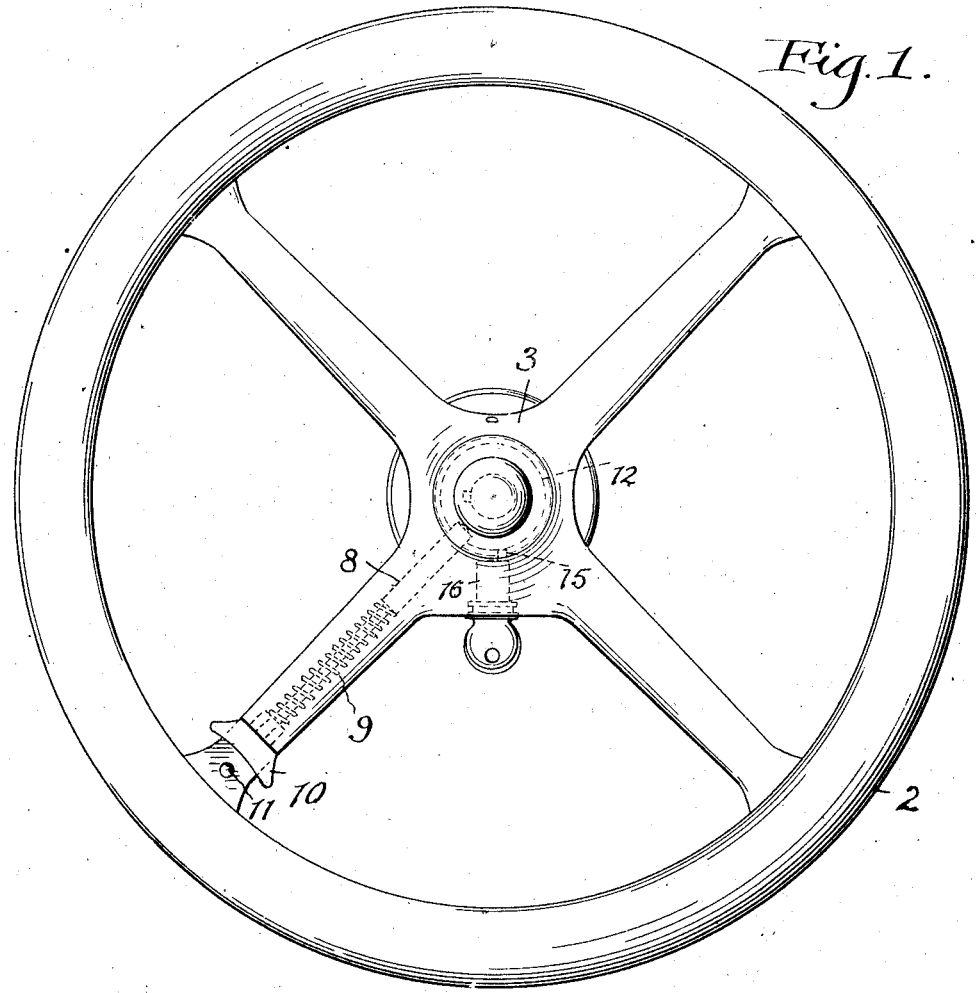
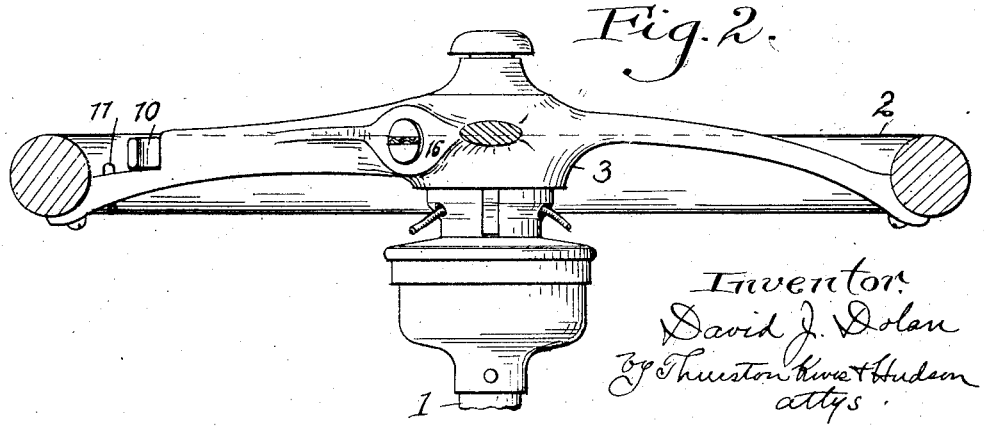
Inventor:
David J. Dolan
By Thurston Kwis & Hudson
attys.

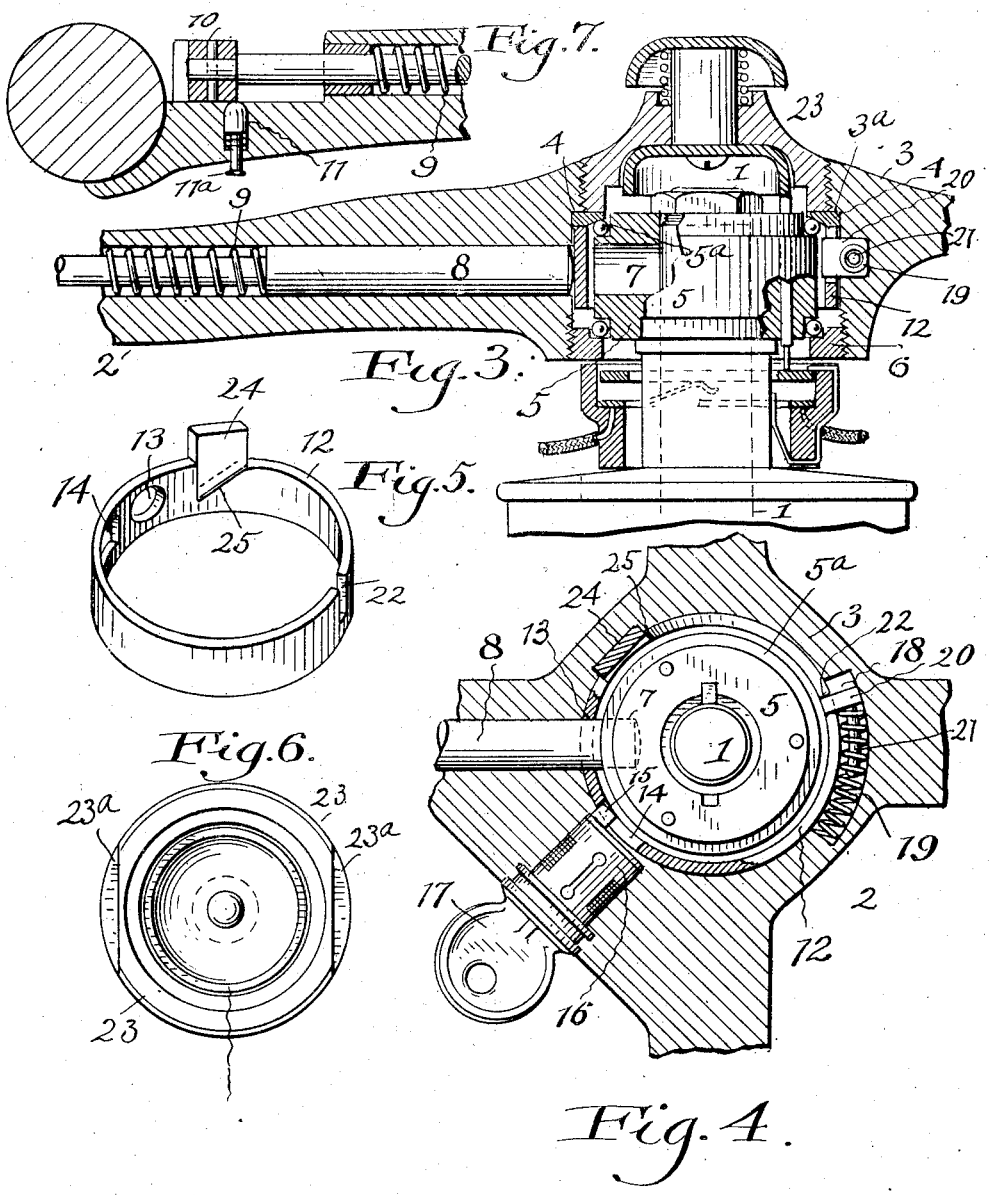

Patented Mar. 29, 1927.

1,622,575

UNITED STATES PATENT OFFICE.

DAVID J. DOLAN, OF CLEVELAND, OHIO.

STEERING-WHEEL LOCK MECHANISM.

Application filed August 23, 1921. Serial No. 494,467.

The present invention relates to a steering wheel and steering column whereby a motor vehicle or any analogous device may be steered, and the object of the invention is to provide a device by which the steering wheel may be secured to the steering column so as to permit turning of the column by the turning of the wheel, or vice versa, upon the operation of the mechanism the wheel may become disengaged from the steering column so as to be inoperative for steering purposes.

A further object of the invention is to provide a mechanism for the purpose wherein the parts shall be contained within the hub of the steering wheel and when the steering wheel is released from its engagement with the steering column, the parts of the mechanism can not be gotten at so that they might be tampered with and defeat the locking action.

On the other hand, when the steering wheel and steering column are secured to each other, then it is perfectly possible to get at the mechanism which is contained within the hub of the steering wheel.

Reference should be had to the accompanying drawings forming a part of this specification, in which Fig. 1 is a top plan view of a steering wheel; Fig. 2 is a side elevation of a steering wheel with portions broken away, and also showing a steering column; Fig. 3 is a sectional elevation showing a steering wheel and a steering column; Fig. 4 is a sectional view of a portion of the steering wheel; Fig. 5 is a perspective view of a part of the locking mechanism; Fig. 6 is a bottom plan view of a cap; Fig. 7 is a sectional elevation of a portion of the steering wheel.

The steering column or that part which definitely turns in the steering of the vehicle of which it forms a part, is indicated at 1 in Fig. 3, that is to say, the upper end of it is so indicated, which is the only part thereof with which we are concerned.

The wheel may be generally represented at 2, and comprises the usual rim portion with the spider like arms which co-operate with it, and these spider like arms unite in a central or hub structure which is represented at 3. This hub structure has a central opening through it and is provided with a shoulder which is indicated at $3^a$. Against this shoulder there seats a ball race ring 4. On the end of the steering column 1 there is a body member which is indicated at 5, this being held on the post by means of a nut or similar structure at the end of the post, and it should be noted that the body member 5 is secured to the steering column so as to be rotatable therewith.

The top of the body member 5 is notched out as indicated at $5^a$, and this notched out portion together with the ring 4 constitutes an upper ball race. The lower portion of the body member 5 is also notched out and this together with a ring 6 which is threaded into the under side of the opening in the hub 3 of the steering wheel, constitutes the two members between which ball bearings may be placed to provide a lower ball race. It will, therefore, be apparent that the wheel is mounted on the steering post by ball bearings, and while this is not in and of itself an important item, it does contribute to the general functioning of the wheel inasmuch as when the wheel is released from the steering column so as to be free therefrom, the wheel will very readily turn because of the ball bearing structure which has been described, and there will be no binding action or friction which could by any possibility give sufficient gripping action between the steering wheel and the steering column so as to make possible any steering relationship.

In the body member 5 there is located a hole or depression 7 and this hole is adapted to receive the end of a bolt or locking element which is indicated at 8. The member 8 is mounted in a suitable opening provided in one of the arms of the spider of the steering wheel, and this member 8 is normally urged inwardly by means of a spring 9 which is suitably mounted in the arm. Under normal conditions the locking member 8 will occupy the hole or opening 7 so that the steering wheel and the steering column will be locked to each other to enable the steering functions to be performed.

The locking bolt 8 at its outer end has a finger engaging member 10 by which it may be withdrawn from its engagement with the hole or opening 7. For the purpose of preventing accidental withdrawal of the member 10 a retaining pin 11 extends through a suitable opening in the arm and normally stands in front of the member 10. When the member 10 is withdrawn the pin 11 may be withdrawn by pulling the lower portion of the pin 11ª against the action of the spring which holds it.

Located within the opening in the hub of the steering wheel and surrounding the body member 5 is a movable retaining member which is generally indicated at 12. This retaining member is an annular band and this band is provided at one portion with an opening 13 through which the locking element 8 will pass when the locking element is engaging in the opening 7. There is also another opening which is indicated at 14, this being a somewhat elongated opening, and in this opening there will normally extend a pin 15 which pin is operated by a lock mechanism which is generally indicated at 16, this lock mechanism being operated by a suitable key such as indicated at 17, which key as will be readily understood, is removable.

The lock mechanism 16 as a unit occupies a suitable opening in the hub of the spider of the steering wheel, and when the key is turned it will move the pin or projection 15, and this pin or projection when it engages with the end walls of the slot 14 will cause a movement of the retaining member 12.

At one portion the inner wall of the hub of the spider is formed with a recess 18 and in this recess there is a coiled spring 19 which at one of its ends bears against an inner wall of the recess, and the opposite end of the spring co-operates with a movable head 20 which movable head has an extending arm 21 which lies within a portion of the coiled spring 19. The head 18 bears against a slot 22 which is formed in the retaining member 12, and as will be readily understood the function of the spring is to move the retaining member 12 to such an extent as to relieve any tension which may be placed upon the spring 19, as will be subsequently described.

If we assume in the first instance that the locking element 8 is occupying the position shown in Fig. 3, then under such conditions the spring 19 is fully extended and the member 12 is moved to such position that the opening 13 is out of registry with the end of the locking element 8. If, now, the key 17 be turned so as to move the retaining member 12 against the action of the spring 19, the retaining member will be moved so that the hole 13 will be in line with the locking element 8, which under the influence of the spring 9 will be pushed through this opening 13 and by turning the steering wheel through a greater or less distance the bolt 8 will finally enter the recess 7 so that the steering wheel and the steering column are locked to each other and in operative position for steering purposes.

It is to be noted that under these conditions the spring 19 is compressed and the several parts occupy substantially the relationship which is shown in Fig. 4. If it be desired to disengage the steering wheel and the steering column, the locking member 8 is withdrawn by pulling upon the operating part 10 thereof, and under these conditions as soon as the locking member 8 passes through the opening 13 in the retaining member 12, the compressive force on the spring 19 is relieved and it immediately moves the retaining member 12 so that the opening 13 is not in line with the locking element 8, and thereupon if the locking element 8 be released it will freely abut against an imperforate portion of the retaining member 12 in the manner shown in Fig. 3.

Under these conditions the steering wheel is freely rotatable because as will be seen, the retaining member 12 will rotate with the steering wheel.

Thereafter, when by means of the key 17 the pin 15 is moved so as to move the retaining member 12, so that the opening 13 aligns with the locking element 8, then the steering wheel and steering post may again become locked to each other as previously described.

For the purpose of removing the steering wheel from the steering column it is necessary to provide access to the nut on the end of the steering column which engages with and holds the body member 5 upon the steering column. Access to this nut is obtained by removing a central cap 23 which has a threaded portion that engages with a correspondingly threaded portion on the inner wall of the opening in the hub of the steering wheel.

It is obviously necessary to provide against the removal of this cap when the steering wheel is disengaged from the steering column, because if this were not done, it would be a simple matter to remove the nut at the end of the steering column, remove the whole steering wheel, and substitute another one of usual and common form. Therefore it is an additional purpose of the present invention to provide mechanism for the removal of the cap 23, so that when the steering wheel and steering column are in engagement it is possible to gain access to the interior of the hub when desired. This is accomplished by providing a detent member 24 which is somewhat wedge-shaped along its lower surface, and this member 24 engages with a V-shaped groove 25 which is formed in the retaining member 12. It will be obvious that when the retaining member 12 moves in a counter clockwise direction, if we assume the member 24 to be held against rotary movement, it will cause the member 24 to rise, and conversely when the member 12 is moved in a clockwise direction, after having been moved as before stated, it will permit the member 24 to drop back to its original position.

The member 24 moves in a vertical groove formed in a portion of the inner side wall of the spider. The cap 23 has opposite portions of its side wall made flat, as indicated at 23ª. The engagement between the cap and the hub of the steering wheel is such that when the cap is screwed to its innermost position one of the flat portions 23ª will be above the detent member 23. Therefore when the retaining member 12 is moved by the spring 19, when the locking element 8 is withdrawn, it will cause the member 24 to be moved into contact with the flat surface 23ª, and this will prevent the unscrewing of the cap 53.

When subsequently the retaining member 12 is moved into the position 12, then the detent member 24 may return to its initial position, and out of engagement with the flat side 23ª, and under such conditions the cap member may be readily removed.

I have before called attention to the fact that by merely removing the nut which is on the end of the post 1, the steering wheel, together with the parts associated therewith may be removed as a unit.

This is important from another point of view in that it permits the ring 6 to be adjusted so as to take up the ball bearing. The removal of the wheel is a simple operation and the adjustment is also a simple operation. This adjustment is of course necessary in order to eliminate lost motion.

Attention is called to the fact that it is not necessary to leave the key in the lock when the steering wheel is connected with the steering post. When the key is turned so that the projection 15 moves the band 12 to permit the locking bolt 8 to enter the recess 7, it is obvious that the band 12 will be held against movement because of the fact that the bolt 8 has moved into the projection 7. Consequently the key 17 may be turned to its initial position and withdrawn and this is entirely possible because of the fact that the slot 14 is elongated sufficiently for the purpose.

Having described my invention, I claim:

1. A rotatable steering column member, a rotatable steering wheel member loosely mounted upon the steering column, a locking element carried by one of said members, the other of said members having an opening to receive a portion of said element whereby the said members will be connected together, an annular retaining member adapted to move in front of said locking element when it is withdrawn, and means for moving the said retaining member.

2. The combination of a rotatable steering column member, and a rotatable steering wheel member loosely mounted thereon, a locking element carried by one of said members the other of said members having an opening to receive a portion of said element whereby the steering wheel and steering column are secured to each other, a spring pressed retainer member which under said spring action moves in front of said locking element when it is withdrawn, and means for moving the said retainer member to permit the locking element to enter the opening for the purpose of connecting the steering wheel with the steering column.

3. The combination with a rotatable steering member, a rotatable steering wheel member loosely mounted thereon, a locking element carried by one of said members, the other of said members having an opening to receive said locking element, a movable retainer member which moves in front of said locking element when the same is withdrawn and provided with a recess for said element, and a key operated lock mechanism for withdrawing said retainer member thereby permitting the element to pass said recess and engage in the opening aforesaid.

4. The combination of a rotatable steering column member, a rotatable steering wheel member loosely mounted thereon, a locking element carried by one of said members, the other of said members having an opening to receive said locking element thereby to operatively join the steering wheel and the steering column, a spring pressed retaining member which under the action of said spring moves in front of said locking element when the same is withdrawn and provided with a recess for said element, and a key operated lock mechanism for withdrawing said retaining member thereby permitting the locking element to pass said recess and engage in the aforesaid opening.

5. The combination of a rotatable steering column member, a rotatable steering wheel member loosely mounted on said column, a locking element carried by one of said members, the other of said members having an opening to receive said locking element, a retaining member mounted to turn in the same member which carries the locking element, said retaining member having an opening therein through which the locking element may extend when the locking element and said opening are in alignment, a resilient member for moving said retaining member so that the said opening therein is out of alignment with the said locking element when the locking element is withdrawn, and means for moving said retaining member against the action of said resilient member whereby the opening in said retaining member may be moved in alignment with the locking element.

6. The combination of a rotatable steering column member, a rotatable steering wheel member loosely mounted thereon, a locking element carried by one of said members, the other of said members having an opening to receive said locking element thereby to connect the steering column with the steering wheel, a retaining member carried by the same member which carried the locking element, said retaining member having an opening therein through which the said locking element projects when the steering column and steering wheel are connected to each other, a resilient member for moving the retaining member when the locking element is withdrawn whereby the opening in the retaining member is moved out of alignment with the locking element, and a key operated lock mechanism for moving the said retaining member to a position where the locking element and the opening in the said retaining member are in alignment.

7. The combination of a rotatable steering column member and a rotatable steering wheel member, said steering wheel member having a hub portion by which it is mounted upon said steering column, a locking element carried by one of said members, the other of said members having an opening to receive said element whereby the steering column and steering wheel are operatively connected to each other, an annular retaining member within the hub of the steering wheel and mounted to move with the same member which carries the locking element, the said retaining member having an opening through which the said locking element will extend when the steering column and steering wheel are connected with each other, a spring for moving said annular retaining member to a position such that the opening in the retaining member is out of alignment with the locking element when the locking element is withdrawn, and a key operated lock mechanism for moving the retaining member against the action of the aforesaid spring so that the opening in the retaining member will align with the locking element.

8. The combination of a rotatable steering column, and a rotatable steering wheel mounted thereon, a locking bolt mounted to move radially on the steering wheel, a spring normally urging said locking bolt toward the center of the steering wheel, the said steering column having an opening to receive the end of the locking bolt thereby to operatively connect the steering column and the steering wheel, a retaining member mounted within the hub of the steering wheel, and movable with the steering wheel, said retaining member being provided with an opening through which the locking bolt extends when in engagement with the steering column, a resilient member which moves the retaining member so that the opening in the retaining member is out of alignment with the locking bolt when the locking bolt is withdrawn, and a key operated lock mechanism for moving the retaining member against the action of said spring to bring the opening therein into alignment with the said locking bolt.

9. The combination with a rotatable steering column member of a rotatable steering wheel member, said steering wheel member having an opening therethrough, and a cap which closes the outer end of said opening, a locking element carried by one of said members, the other of said members having an opening to receive the said locking element thereby to connect the said members for steering purposes, a movable retaining member which moves in front of said locking element when it is withdrawn, means for withdrawing said retaining member, and a locking detent member moved by said retaining member to lock the said cap against removal.

10. The combination of a rotatable steering column member, a rotatable steering wheel member mounted thereon, said steering wheel having a hub portion with a central opening, and a cap which closes said opening a locking element carried by one of said members the other of said members having an opening to receive the said locking element, a movable retaining member which moves in front of said locking element when it is withdrawn, and means for withdrawing said retaining member, a locking detent member having a part thereof in engagement with said movable retaining member, said detent member being moved in a position to lock the cap when the movable retaining member moves in front of the said locking bolt, and said locking detent being released when the movable retaining member is withdrawn.

11. The combination with a rotatable steering column member of a rotatable steering wheel member mounted thereon, said steering wheel having a hub portion with an opening therethrough, a threaded cap member for closing the outer end of said opening, a locking element carried by one of said members the other of said members having an opening to receive said locking element thereby to operatively connect the steering column with the steering wheel, a movable retainer member which moves in front of said locking element when it is withdrawn, means for withdrawing said retaining member, a slidable locking detent member mounted in the said hub, and movable into engagement with said cap to prevent removal of said cap said locking detent member being operated by the said movable retainer member when the retainer member moves in front of the locking element, the said locking detent being released when the retainer member is withdrawn.

12. The combination with a rotatable steering column member of a rotatable steering wheel member, said steering wheel having a hub with a central opening in its upper face, a cap for said opening, a movable member for connecting or disconnecting the steering wheel and the steering column, a separate movable locking detent operable by the said movable member when the same is moved to disconnect the steering wheel from the steering post, said locking detent moving into position to retain the said cap against movement.

13. The combination with a rotatable steering column member, a rotatable steering wheel member loosely mounted thereon, a locking element carried by one of said members, the other of said members having an opening to receive said locking element, a movable retaining member which moves in front of said locking element when the same is withdrawn, a key operated lock mechanism, a projecting member carried by the lock mechanism, and an elongated slot in said retainer member into which said projection extends.

14. The combination of a rotatable steering column member, a rotatable steering wheel member loosely mounted on said column, a locking element carried by one of said members, the other of said members having an opening to receive said locking element, a retaining member mounted to turn in the same member which carries the locking element, said retaining member having an opening through which the locking element may extend when the locking member and said opening are in alignment, a resilient member for moving said retaining member so that the said opening therein is out of alignment with the said locking element when the locking element is withdrawn, means for moving said retaining member against the action of said resilient member whereby to bring the opening in the retaining member into alignment with the locking member, said means comprising a lock mechanism and a key for operating said lock mechanism, said lock mechanism having a projection at the inner end thereof and the said retaining member having an elongated slot into which said projection extends.

In testimony whereof, I hereunto affix my signature.

DAVID J. DOLAN.